United States Patent
Tomizawa et al.

(10) Patent No.: US 9,764,774 B2
(45) Date of Patent: Sep. 19, 2017

(54) VEHICLE BODY FRONT PORTION STRUCTURE

(71) Applicant: TOYOTA JIDOSHA KABUSHIKI KAISHA, Toyota-shi (JP)

(72) Inventors: Yoshihito Tomizawa, Toyota (JP); Takerou Katou, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/059,662

(22) Filed: Mar. 3, 2016

(65) Prior Publication Data

US 2016/0264179 A1    Sep. 15, 2016

(30) Foreign Application Priority Data

Mar. 11, 2015  (JP) ................. 2015-048639

(51) Int. Cl.
*B60J 7/00*       (2006.01)
*B62D 25/14*      (2006.01)
*B62D 25/04*      (2006.01)

(52) U.S. Cl.
CPC ............. *B62D 25/14* (2013.01); *B62D 25/04* (2013.01)

(58) Field of Classification Search
CPC ........ A47B 96/021; B65D 2543/00629; B65D 2543/00685; B65D 2543/00796; B65H 2701/31; B60R 11/0205; B60G 2202/312; B62D 21/11; B62D 25/081; B62D 25/082
USPC ................. 296/187.09, 203.02, 204
See application file for complete search history.

(56) References Cited

U.S. PATENT DOCUMENTS

| | | | | |
|---|---|---|---|---|
| 5,641,194 A | * | 6/1997 | Honma | B62D 21/157 296/187.12 |
| 6,364,358 B1 | * | 4/2002 | Miller | B62D 25/04 280/784 |
| 9,187,133 B2 | * | 11/2015 | Rangaswamaiah | B62D 25/04 |
| 9,333,989 B2 | * | 5/2016 | Donabedian | B62D 21/02 |
| 2003/0141712 A1 | | 7/2003 | Miyasaka | |
| 2014/0001790 A1 | * | 1/2014 | Zischke | B62D 25/2018 296/187.03 |
| 2015/0008703 A1 | * | 1/2015 | Furusaki | B62D 21/152 296/187.08 |

(Continued)

FOREIGN PATENT DOCUMENTS

| | | |
|---|---|---|
| JP | 2002-249079 | 9/2002 |
| JP | 2015-116979 | 6/2015 |

*Primary Examiner* — Kiran B Patel
(74) *Attorney, Agent, or Firm* — Oblon, McClelland, Maier & Neustadt, L.L.P.

(57) ABSTRACT

A vehicle body front portion structure includes a front pillar, a dash portion and a load transmission portion. The dash portion includes a dash panel. The load transmission portion includes a dash side structure portion that is fixed to a surface facing he vehicle rear side of a vehicle width direction outer side region of the dash portion, a pillar side structure portion that is fixed to a surface facing the vehicle width direction outer side of the pillar inner panel, and an intermediate structure portion that is connected to at least one of the dash side structure portion or the pillar side structure portion. The intermediate structure portion penetrates a hole portion and is set at a location at which a load that acts on the dash side structure portion when there is a frontal collision is transmitted to the pillar side structure portion.

8 Claims, 9 Drawing Sheets

(56) References Cited

U.S. PATENT DOCUMENTS

| | | | |
|---|---|---|---|
| 2016/0016612 A1* | 1/2016 | Torikawa | B62D 25/025 280/784 |
| 2016/0039466 A1* | 2/2016 | Yamamoto | B62D 25/04 296/193.06 |
| 2016/0052554 A1* | 2/2016 | Ozawa | B62D 21/152 296/187.09 |
| 2016/0083015 A1* | 3/2016 | Kiyoshita | B62D 25/025 296/187.09 |
| 2016/0194031 A1* | 7/2016 | Yamamoto | B62D 25/025 296/187.1 |
| 2016/0194033 A1* | 7/2016 | Kondo | B62D 25/04 296/192 |
| 2016/0257344 A1* | 9/2016 | Hasegawa | B62D 25/025 |
| 2016/0257345 A1* | 9/2016 | Hasegawa | B62D 25/025 |
| 2016/0355214 A1* | 12/2016 | Irie | B62D 21/157 |
| 2017/0050679 A1* | 2/2017 | Shirooka | B62D 25/025 |

* cited by examiner

VEHICLE BODY FRONT PORTION STRUCTURE

CROSS-REFERENCE TO RELATED APPLICATION

This application claims priority under 35 USC 119 from Japanese Patent Application No. 2015-48639 filed on Mar. 11, 2015, the disclosure of which is incorporated by reference herein.

BACKGROUND

Technical Field

An exemplary embodiment of the present invention relates to a vehicle body front portion structure.

Description of the Related Art

Japanese Patent Application Laid-Open (JP-A) No. 2002-249079 discloses a structure in which an energy-absorbing member formed of foam urethane is provided in a range from a lower portion front face of a front pillar to a lower portion front face at a dash panel side portion side. In this structure, when there is a frontal collision, a collision load is transmitted from a front wheel through the energy-absorbing member to plural vehicle body structural members.

SUMMARY OF THE INVENTION

Technical Problem

However, even with the conventional technology described above, if, for example, the front wheel is moved back to a joining portion between the dash panel and the front pillar when there is a frontal collision such as a micro-wrap collision or the like, a load acts in a direction of separation of the joining portion. Therefore, there is scope for improvement in regard to suppressing separation between the dash panel and the front pillar.

In consideration of the circumstances described above, an object of an exemplary embodiment of the present invention is to provide a vehicle body front portion structure that can suppress separation between a dash panel and a front pillar when there is a frontal collision such as a micro-wrap collision or the like.

Solution to Problem

A vehicle body front portion structure according to a first aspect of the present invention includes: a front pillar disposed along a vehicle vertical direction at a vehicle width direction outer side end portion of a vehicle cabin front portion, the front pillar including a pillar inner panel at a vehicle width direction inner side end portion of the front pillar, the pillar inner panel including an inner side upright wall portion that extends in the vehicle vertical direction and a vehicle front-and-rear direction, and a hole portion being formed penetrating a lower portion of the inner side upright wall portion; a dash portion including a dash panel that structures a vehicle cabin front wall, a vehicle width direction outer side end portion of the dash panel being joined to the front pillar, and the dash portion separating the vehicle cabin from a power unit compartment that is located at a vehicle front side of the vehicle cabin; and a load transmission portion including a dash side structure portion that is fixed to a surface of a vehicle width direction outer side region of the dash portion, which surface faces a vehicle rear side, a pillar side structure portion that is fixed to a surface of the inner side upright wall portion of the pillar inner panel, which surface faces a vehicle width direction outer side, and an intermediate structure portion that is connected to at least one of the dash side structure portion or the pillar side structure portion, the intermediate structure portion penetrating the hole portion, and the intermediate structure portion being set at a location at which the intermediate structure portion transmits a load that acts on the dash side structure portion when there is a frontal collision to the pillar side structure portion.

According to the structure described above, the dash side structure portion of the load transmission portion is fixed to the surface that faces the vehicle rear side of the vehicle width direction outer side region of the dash portion. Therefore, when there is a frontal collision, if the dash portion is pushed from a vehicle front side of the joining portion between the dash panel and the front pillar, a load toward the vehicle rear side acts on the dash portion and the dash side structure portion of the load transmission portion, and a load toward the vehicle width direction inner side acts on the same in a direction of detachment from the front pillar.

In this case, the load transmission portion is provided with the pillar side structure portion and the intermediate structure portion in addition to the dash side structure portion. The pillar side structure portion is fixed to the surface that faces the vehicle width direction outer side of the inner side upright wall portion of the pillar inner panel. The intermediate structure portion is connected with at least one of the dash side structure portion or the pillar side structure portion, penetrates the hole portion in the inner side upright wall portion and, when there is a frontal collision, transmits a load acting on the dash side structure portion to the pillar side structure portion. Thus, the load transmission portion is capable of bearing a load as part of a load transmission path, and a load that acts on the joining portion between the dash panel and the front pillar when there is a frontal collision is reduced correspondingly.

In a vehicle body front portion structure according to a second aspect of the present invention, in the first aspect, the load transmission portion is structured by two members, the two members being a dash side member including the dash side structure portion and a pillar side member including the pillar side structure portion, and the intermediate structure portion is provided at the dash side member or the pillar side member, a vehicle front side end portion of the pillar side member extends toward a vehicle front side, and a rear projection portion is formed at a vehicle width direction outer side end portion of the dash side member, the rear projection portion projecting toward the vehicle rear side and being located at the vehicle width direction outer side relative to the vehicle front side end portion of the pillar side member.

According to the structure described above, the load transmission portion is structured by two members, the dash side member and the pillar side member. The dash side member is fixed to the vehicle width direction outer side region of the dash portion, and the pillar side member is fixed to the inner side upright wall portion of the pillar inner panel. Therefore, assembly characteristics are better than in a case in which the load transmission portion is structured by a single member. In addition, the vehicle front side end portion of the pillar side member extends to the vehicle front side and, correspondingly, the rear projection portion that is formed at the vehicle width direction outer side end portion of the dash side member projects to the vehicle rear side and is located at the vehicle width direction outer side relative to the vehicle front side end portion of the pillar side member.

Therefore, when there is a frontal collision, if the dash side member moves diagonally to the vehicle rear and to the vehicle width direction inner side along with the vehicle width direction outer side region of the dash portion, the rear projection portion of the dash side member engages with the vehicle front side end portion of the pillar side member and transmits the load acting on the dash side member to the pillar side member.

In a vehicle body front portion structure according to a third aspect of the present invention, in the second aspect, the pillar side member includes the intermediate structure portion, the intermediate structure portion including a portion that extends to a vehicle width direction inner side from the vehicle front side end portion of the pillar side structure portion, a front projection portion that projects toward the vehicle front side is formed at a vehicle width direction inner side end portion of the intermediate structure portion, and the rear projection portion of the dash side member is located at the vehicle width direction outer side relative to the front projection portion of the pillar side member.

According to the structure described above, when there is a frontal collision, the rear projection portion of the dash side member may be engaged with the front projection portion of the pillar side member within a range in a vehicle front view in which the dash side member overlaps with a range in which the collision load is received via the dash portion. Therefore, when there is a frontal collision, the collision load may be reliably transmitted from the dash side member to the pillar side member. Thus, even when the load transmission portion is structured by two members, separation of the dash panel from the front pillar when there is a frontal collision may be reliably suppressed.

In a vehicle body front portion structure according to a fourth aspect of the present invention, in the third aspect, an incision portion with a semi-circular shape in a vehicle side view is formed at the rear projection portion or the front projection portion, the incision portion being open to a side of a direction of projection, and an inflected portion with an L-shape in a vehicle plan view is formed by the other of the rear projection portion or the front projection portion and a portion connecting with the other of the rear projection portion or the front projection portion, the inflected portion being set to be within a range in the vehicle vertical direction that corresponds with a location at which the incision portion is formed.

According to the structure described above, even if there is irregularity in the input direction of a collision load when there is a frontal collision and the dash side member tilts in the vehicle side view, the portion connecting with the other of the rear projection portion or the front projection portion enters into the inside of the incision portion formed in the one of the rear projection portion or the front projection portion. Thus, a peripheral portion of the incision portion formed in the one of the rear projection portion or the front projection portion may be reliably engaged with the other of the rear projection portion or the front projection portion.

In a vehicle body front portion structure according to a fifth aspect of the present invention, in the third aspect, a penetrating hole with a circular shape is formed in the rear projection portion, the penetrating hole penetrating in a vehicle width direction, and the pillar side member includes the intermediate structure portion, the intermediate structure portion penetrating the penetrating hole.

According to the structure described above, even if there is irregularity in the input direction of a collision load when there is a frontal collision and the dash side member tilts in the vehicle side view, a periphery portion of the penetrating hole in the rear projection portion of the dash side member may be reliably engaged with the front projection portion of the pillar side member.

In a vehicle body front portion structure according to a sixth aspect of the present invention, in the first aspect, the load transmission portion is structured by a single member that includes the dash side structure portion, the intermediate structure portion and the pillar side structure portion.

According to the structure described above, when there is a frontal collision, a collision load may be transmitted from the dash side structure portion via the intermediate structure portion to the pillar side structure portion from when the collision load first acts on the dash side structure portion.

Advantageous Effects of Invention

According to the vehicle body front portion structure in accordance with the exemplary embodiment of the present invention, when there is a frontal collision such as a micro-wrap collision or the like, separation of the dash panel from the front pillar may be suppressed.

DETAILED DESCRIPTION OF PREFERRED EMBODIMENTS

First Exemplary Embodiment

A vehicle body front portion structure according to a first exemplary embodiment of the present invention is described using FIG. 1 to FIG. 4. An arrow FR that is shown as appropriate in these drawings indicates a vehicle front side, an arrow UP indicates a vehicle upper side, and an arrow IN indicates a vehicle width direction inner side. In the following descriptions, where the directions front, rear, up, down, left and right are recited without being particularly specified, the same represent the front and rear in the vehicle frontand-rear direction, up and down in the vehicle vertical direction, and left and right in the vehicle left-and-right direction (a vehicle width direction).

Figure 1:
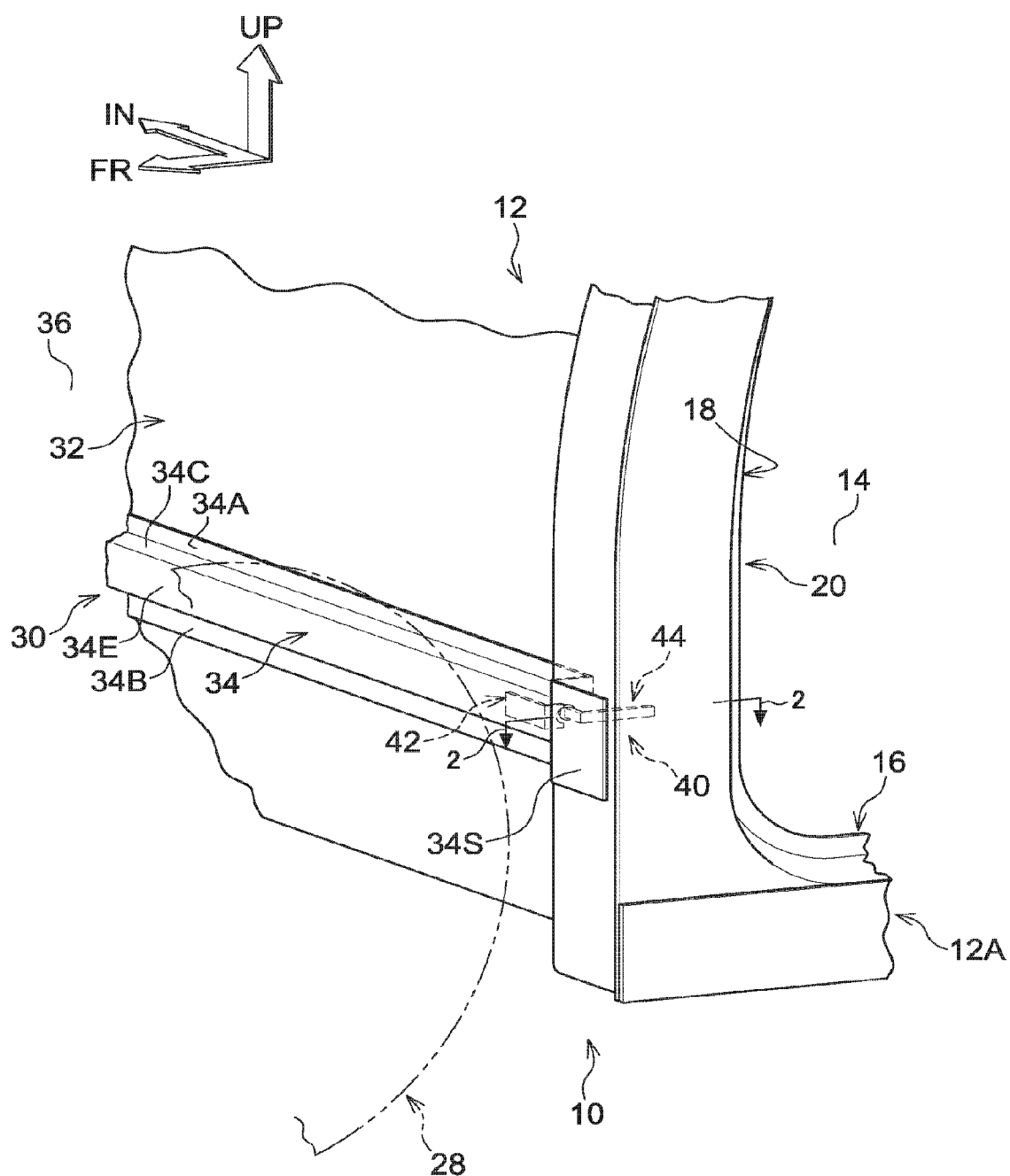
FIG. 1 is a perspective view showing a vehicle body front portion structure in accordance with a first exemplary embodiment of the present invention.

FIG. 1 shows a perspective view of a state in which a portion of a vehicle body left side of an automobile (a vehicle) 12 is viewed diagonally from the front side at a vehicle width direction outer side. A vehicle body front portion structure 10 according to the present exemplary embodiment is employed in this automobile 12. The vehicle body right side is not shown in FIG. 1 but the vehicle body front portion structure 10 is basically structured with left-and-right symmetry.

As is shown in FIG. 1, a front pillar 20 is disposed in the vehicle vertical direction at a vehicle width direction outer side end portion of a front portion of a vehicle cabin 14. The front pillar 20 is provided standing to the vehicle upper side from a front end portion of a rocker 16. The rocker 16 extends in the vehicle front-and-rear direction at a lower portion of a vehicle side portion 12A. An upper end portion of the front pillar 20 is joined to a front end portion of a roof side rail (not shown in the drawings). The roof side rail extends in the vehicle front-and-rear direction at an upper portion of the vehicle side portion 12A. A center pillar (which is not shown in the drawings) is provided standing to the vehicle upper side from a length direction middle portion of the rocker 16. An upper end portion of the center pillar is joined to a length direction middle portion of the roof side rail.

The front pillar 20, the rocker 16, the roof side rail and the center pillar are all vehicle body framework members with closed cross section structures and structure a door opening portion 18. That is, the front pillar 20 is disposed in the vehicle vertical direction at a front edge side of the door opening portion 18. The door opening portion 18 communicates between the exterior and the interior of the vehicle cabin and can be opened and closed by a side door (which is not shown in the drawings).

Figure 2:
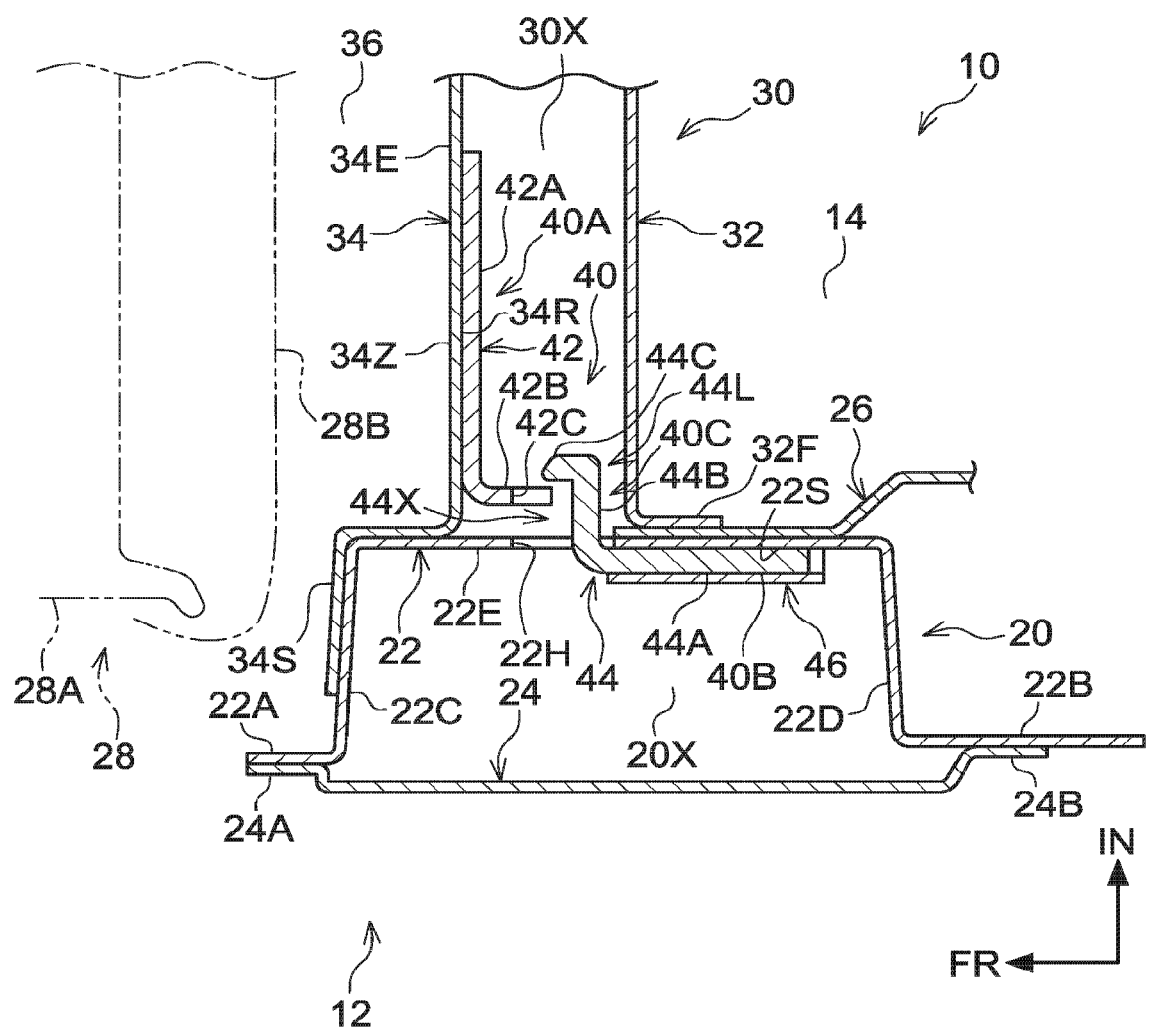
FIG. 2 is a magnified plan sectional view showing a magnification of a state cut along line 2-2 in FIG. 1.

FIG. 2 shows a magnified plan sectional view of a state cut along line 2-2 in FIG. 1. The front pillar 20 is provided with a pillar inner panel 22 and a pillar outer panel 24. The pillar inner panel 22 is disposed at the vehicle cabin interior side and structures an inner plate of the front pillar 20. The pillar outer panel 24 is disposed at the vehicle cabin exterior side of the pillar inner panel 22 and structures an outer plate of the front pillar 20.

A cross-sectional shape of the pillar inner panel 22 in the vehicle plan view is formed in a pork pie hat shape, an opening portion of which is oriented to the vehicle width direction outer side. The pillar inner panel 22 is provided with a front flange portion 22A that is formed at a vehicle front side end portion thereof and a rear flange portion 22B that is formed at a vehicle rear side end portion thereof. By contrast, the pillar outer panel 24 is formed in a substantially flat shape that extends roughly in the vehicle front-and-rear direction and the vehicle vertical direction. More specifically, a cross-sectional shape of the pillar outer panel 24 in the vehicle plan view is formed in a shape in which a vehicle front-and-rear direction middle portion thereof is recessed slightly to the vehicle width direction outer side. The pillar outer panel 24 is provided with a front flange portion 24A that is formed at a vehicle front side end portion thereof and a rear flange portion 24B that is formed at a vehicle rear side end portion thereof.

The front flange portion 22A of the pillar inner panel 22 and the front flange portion 24A of the pillar outer panel 24 are joined together by welding. The rear flange portion 22B of the pillar inner panel 22 and the rear flange portion 24B of the pillar outer panel 24 are joined together by welding. Because of these joinings, a closed cross section 20X is formed between the pillar inner panel 22 and the pillar outer panel 24. The closed cross section 20X extends substantially in the vehicle vertical direction. A portion of a side outer panel (not shown in the drawings) is disposed at the vehicle width direction outer side of the pillar outer panel 24.

The pillar inner panel 22 is provided with a front wall portion 22C and a rear wall portion 22D. The front wall portion 22C is inflected from a vehicle rear side end portion of the front flange portion 22A and extends to the vehicle width direction inner side. The rear wall portion 22D is inflected from a vehicle front side end portion of the rear flange portion 22B and extends to the vehicle width direction inner side. The front wall portion 22C and rear wall portion 22D are disposed to oppose one another in the vehicle front-and-rear direction and are slightly angled in directions to approach one another toward the vehicle width direction inner side in the vehicle plan view. A vehicle width direction inner side end portion of the front wall portion 22C and a vehicle width direction inner side end portion of the rear wall portion 22D are connected in the vehicle front-and-rear direction by an inner side upright wall portion 22E. The inner side upright wall portion 22E of the pillar inner panel 22 extends in the vehicle vertical direction and the vehicle front-and-rear direction at a vehicle width direction inner side end portion of the front pillar 20.

A hole portion 22H is formed penetrating the inner side upright wall portion 22E forward of a vehicle front-and-rear direction middle portion of the inner side upright wall portion 22E. The hole portion 22H is set at a vehicle vertical direction location that corresponds with an vertical direction middle portion of a front wheel 28, that is, at a lower portion of the inner side upright wall portion 22E. The front wheel 28 is provided with a wheel 28A and a tire 28B. The wheel 28A includes a vertical circular plate portion at a turning axis thereof. The tire 28B is retained at an outer periphery portion of the wheel 28A. The hole portion 22H in the inner side upright wall portion 22E of the pillar inner panel 22 is formed in a semi-circular shape (a "D" shape) with a circular arc portion at the vehicle front side thereof in a vehicle side view. An extension 26 is disposed at the vehicle width direction inner side of the inner side upright wall portion 22E. The extension 26 is attached to the inner side upright wall portion 22E at a vehicle rear side of the hole portion 22H. A rear portion of the extension 26 protrudes to the vehicle width direction inner side and a vehicle rear side from the closed cross section 20X of the front pillar 20. An electronic control unit (ECU, not shown in the drawings) is mounted at a rear portion of the extension 26.

A dash portion 30 is disposed between the left and right front pillars 20. The dash portion 30 includes a dash panel 32 and a dash cross-member 34. The dash portion 30 separates the vehicle cabin 14 from a power unit compartment 36 that is disposed at the vehicle front side of the vehicle cabin 14. The dash panel 32 is disposed between the inner side upright wall portions 22E of the left and right front pillars 20 that structure a vehicle cabin front wall. A side flange portion 32F that protrudes to the vehicle rear side is formed at each vehicle width direction outer side end portion of the dash panel 32. The side flange portion 32F of the dash panel 32 is joined by spot welding to the extension 26 and a vehicle front-and-rear direction middle portion of the inner side upright wall portion 22E of the front pillar 20 (more specifically, a region at the vehicle rear side relative to the hole portion 22H).

As shown in FIG. 1 and FIG. 2, the dash cross-member 34 is disposed at a front face lower portion of the dash panel 32. The dash cross-member 34 has a long, narrow shape extending in the vehicle width direction. As shown in FIG. 1, a region of the dash cross-member 34 that excludes the two length direction end portions thereof is formed in a pork pie hat shape, an opening portion of which is oriented to the vehicle rear side in a vehicle side view. The dash cross-member 34 is provided with an upper flange portion 34A formed at a vehicle upper side end portion thereof and a lower flange portion 34B formed at a vehicle lower side end portion thereof. The upper flange portion 34A and lower flange portion 34B of the dash cross-member 34 are joined by spot welding or the like to a front face lower portion of the dash panel 32. Thus, the dash cross-member 34 forms a closed cross section 30X with the dash panel 32 (see FIG. 2).

The dash cross-member 34 is provided with an upper wall portion 34C and a lower wall portion (not shown in the drawings). The upper wall portion 34C is inflected from a vehicle lower side end portion of the upper flange portion 34A and extends to the vehicle front side. The lower wall portion is inflected from a vehicle upper side end portion of the lower flange portion 34B and extends to the vehicle front side. The upper wall portion 34C and the lower wall portion are disposed to oppose one another in the vehicle vertical direction and are slightly angled in directions to approach one another toward the vehicle front side in the vehicle side view. A vehicle front side end portion of the upper wall portion 34C and a vehicle front side end portion of the lower wall portion are connected in the vehicle vertical direction by a front wall portion 34E. The front wall portion 34E extends in the vehicle vertical direction and the vehicle width direction.

The dash cross-member 34 is provided with a side portion flange portion 34S at each of the two length direction end portions thereof. As shown in FIG. 2, the side portion flange portion 34S is joined by spot welding to the front wall portion 22C and a front end portion (i.e., a region at the vehicle front side relative to the hole portion 22H) of the inner side upright wall portion 22E of the pillar inner panel 22. The hole portion 22H that is formed penetrating the inner side upright wall portion 22E of the front pillar 20 described above faces into an interior space of the closed cross section 30X formed by the dash panel 32 and the dash cross-member 34.

Figure 3:
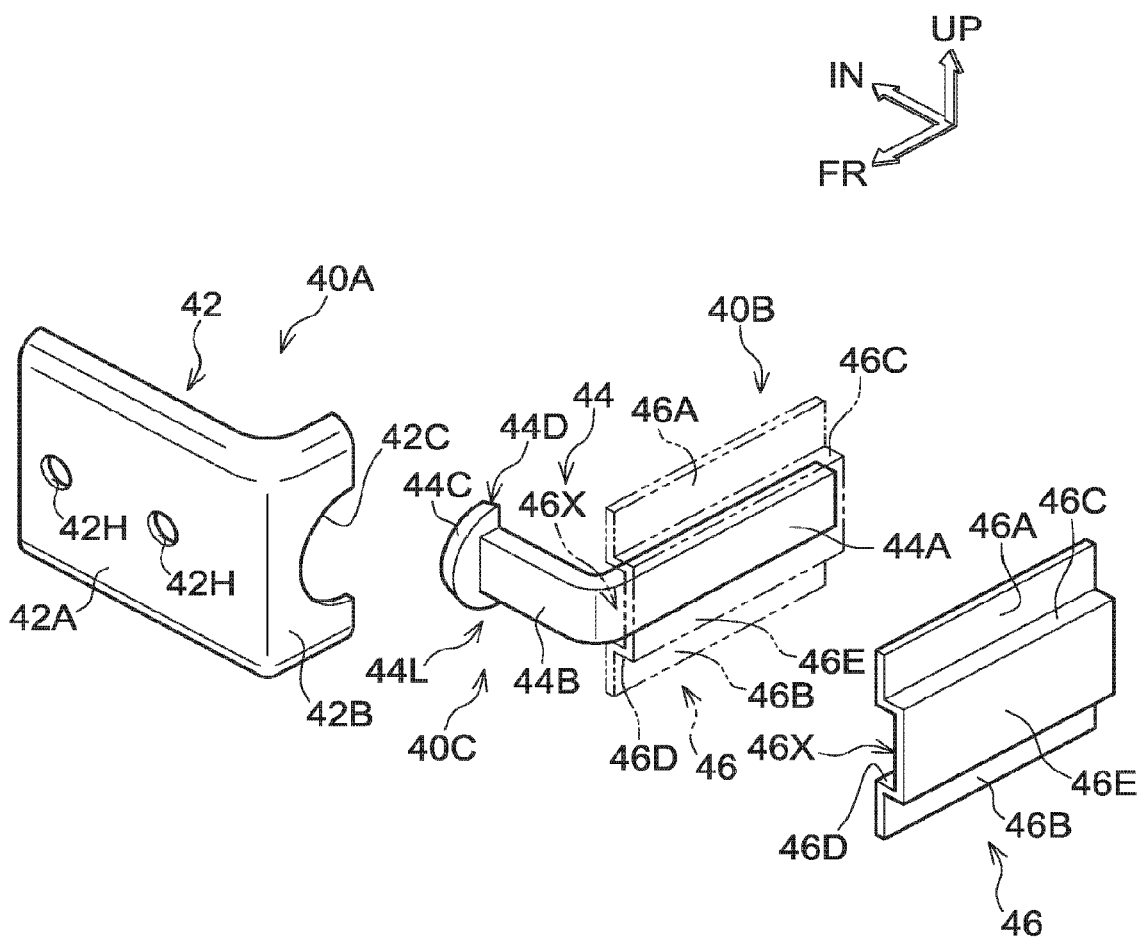
FIG. 3 is an exploded perspective view showing a magnification of a dash side member, a pillar side member and a bracket for assembly that are shown in FIG. 2.

A load transmission portion 40 is set in a range extending through both the closed cross section 30X of the dash portion 30 and the closed cross section 20X of the front pillar 20. The load transmission portion 40 is structured by two members, a dash side member 42 and a pillar side member 44. The dash side member 42 structures a dash side structure portion 40A. The pillar side member 44 structures a pillar side structure portion 40B and an intermediate structure portion 40C. FIG. 3 shows the dash side member 42 and the pillar side member 44 in an exploded perspective view.

The dash side member 42 is structured by, for example, a plate-shaped member fabricated of metal. The dash side member 42 is a member whose shape in the vehicle plan view is an L-shape and that is long in the vehicle width direction. As shown in FIG. 2, the dash side member 42 is disposed adjacent to a surface 34R of a vehicle width direction outer side region 34Z of the front wall portion 34E of the dash cross-member 34 (the dash portion 30), which surface 34R faces to the vehicle rear side.

The dash side member 42 is provided with a base plate portion 42A that, in a state in which the dash side member 42 is assembled to the dash portion 30, extends in the vehicle width direction along the front wall portion 34E of the dash cross-member 34. The base plate portion 42A is superposed with the surface 34R that faces the vehicle rear side of the vehicle width direction outer side region 34Z of the front wall portion 34E of the dash cross-member 34, and the base plate portion 42A is fixed by spot welding to the vehicle width direction outer side region 34Z. Through-holes 42H are formed penetrating the base plate portion 42A of the dash side member 42 shown in FIG. 3. The through-holes 42H are reference hole for when spot welding is being performed.

As shown in FIG. 2 and FIG. 3, a rear projection portion 42B is formed at a vehicle width direction outer side end portion of the dash side member 42. The rear projection portion 42B is inflected from the vehicle width direction outer side end portion of the base plate portion 42A and projects to the vehicle rear side. An incision portion 42C is formed in the rear projection portion 42B of the dash side member 42. The incision portion 42C is cut away in a semi-circular shape in the vehicle side view, opening to the vehicle rear side (i.e., a side of a direction of projection of the rear projection portion 42B).

The pillar side member 44 is, for example, fabricated of metal. The pillar side member 44 is a member that is longer in the vehicle front-and-rear direction than in the vehicle width direction. A vehicle vertical direction dimension of the pillar side member 44 is specified to be smaller than a vehicle vertical direction dimension of the open end of the incision portion 42C of the dash side member 42. As shown in FIG. 2, the pillar side member 44 is provided with a base plate portion 44A. The base plate portion 44A is disposed adjacent to a surface 22S of the inner side upright wall portion 22E of the pillar inner panel 22, which surface 22S faces to the vehicle width direction outer side. The base plate portion 44A is fixed to the inner side upright wall portion 22E via a bracket 46. The base plate portion 44A structures the pillar side structure portion 40B of the load transmission portion 40. In the state in which the base plate portion 44A is assembled to the front pillar 20, the base plate portion 44A extends in the vehicle front-and-rear direction and the vehicle vertical direction along the inner side upright wall portion 22E of the pillar inner panel 22 and is disposed with the length direction thereof in the vehicle front-and-rear direction.

The bracket 46 is provided for fixing the pillar side member 44 to the pillar inner panel 22. As shown in FIG. 3, a shape of the bracket 46 in a vehicle front view is formed in a pork pie hat shape, an opening portion of which is oriented to the vehicle width direction inner side, and a length direction of the bracket 46 is in the vehicle front-and-rear direction. That is, the bracket 46 is provided with a recessed slot formation portion 46X, an upper flange portion 46A and a lower flange portion 46B. An opening portion of the bracket 46 is oriented to the vehicle width direction inner side and the recessed slot formation portion 46X extends in the vehicle front-and-rear direction. The upper flange portion 46A is formed at a vehicle upper side end portion of the bracket 46 and the lower flange portion 46B is formed at a vehicle lower side end portion of the bracket 46. In FIG. 3, the bracket 46 is illustrated by two-dot chain lines in the state in which the pillar side member 44 is attached.

The recessed slot formation portion 46X is provided with an upper wall portion 46C and a lower wall portion 46D. The upper wall portion 46C is inflected from a vehicle lower side end portion of the upper flange portion 46A and extends to the vehicle width direction outer side. The lower wall portion 46D is inflected from a vehicle upper side end portion of the lower flange portion 46B and extends to the vehicle width direction outer side. A vehicle width direction outer side end portion of the upper wall portion 46C and a vehicle width direction outer side end portion of the lower wall portion 46D are connected in the vehicle vertical direction by an outer side upright wall portion 46E. The outer side upright wall portion 46E extends in the vehicle vertical direction and the vehicle front-and-rear direction and is disposed with a length direction thereof in the vehicle front-and-rear direction.

A slot depth of the recessed slot formation portion 46X (i.e., a recess amount in the vehicle width direction) is specified to be substantially equal to a thickness in the vehicle width direction of the base plate portion 44A of the pillar side member 44. An opening width of the recessed slot formation portion 46X in the vehicle vertical direction is specified to be slightly larger than a width in the vehicle vertical direction of the base plate portion 44A of the pillar side member 44. The base plate portion 44A of the pillar side member 44 is disposed at the recess slot interior side of the recessed slot formation portion 46X, and the base plate portion 44A of the pillar side member 44 is fixed to the outer side upright wall portion 46E by arc welding. The upper flange portion 46A and the lower flange portion 46B are superposed with the surface 22S that faces the vehicle width direction outer side at a rear portion (i.e., a region at the vehicle rear side relative to the hole portion 22H) of the inner side upright wall portion 22E of the pillar inner panel 22 shown in FIG. 2, and the upper flange portion 46A and lower flange portion 46B are fixed by spot welding (not shown in the drawings) to the inner side upright wall portion 22E.

The pillar side member 44 is provided with a front side structure portion 44X that is connected to the base plate portion 44A and penetrates the hole portion 22H. The front side structure portion 44X of the pillar side member 44 includes an inner projection portion 44B that extends to the vehicle width direction inner side from a vehicle front side end portion of the base plate portion 44A. A front projection portion 44C that projects to the vehicle front side is formed at a vehicle width direction inner side end portion of the inner projection portion 44B. In the present exemplary embodiment, the front projection portion 44C is inflected from the vehicle width direction inner side end portion of the inner projection portion 44B and extends to the vehicle front side. That is, an inflected portion 44L, Which has an L-shape in the vehicle plan view, is formed by the front projection portion 44C and a portion connecting with the front projection portion 44C (i.e., the inner projection portion 44B). A vehicle front side end portion of the pillar side member 44, that is, the front projection portion 44C, is located at the vehicle width direction inner side relative to the rear projection portion 42B of the dash side member 42. The inflected portion 44L is set to be within a range in the vehicle vertical direction that corresponds with the location at which the incision portion 42C of the rear projection portion 42B is formed.

As shown in FIG. 3, the front projection portion 44C structures a portion of a semi-circular protrusion portion 44D. The semi-circular protrusion portion 44D protrudes in the vehicle vertical direction and the vehicle front direction from the vehicle width direction inner side end portion of a substantially rectangular rod-shaped portion of the inner projection portion 44B. The semi-circular protrusion portion 44D is formed in a semi-circular shape (a "D" shape) with a circular arc portion at the vehicle front side thereof in the vehicle side view. The semi-circular protrusion portion 44D is an element that may be broadly understood as a grapple-shaped portion. The semi-circular protrusion portion 44D of the pillar side member 44 and the rear projection portion 42B of the dash side member 42 constitute a latch structure in which the semi-circular protrusion portion 44D and the rear projection portion 42B may engage with one another when there is a frontal collision. The semi-circular protrusion portion 44D is specified to be slightly smaller than the incision portion 42C.

The front side structure portion 44X described above of the pillar side member 44 shown in FIG. 2 structures the intermediate structure portion 40C of the load transmission portion 40. The front side structure portion 44X is set to a location at which, when there is a frontal collision, the front side structure portion 44X receives a load acting on the dash side member 42 (the dash side structure portion 40A) and transmits the load to the base plate portion 44A of the pillar side member 44 (the pillar side structure portion 40B).

Operation and Effects

Now, operation and effects of the above exemplary embodiment are described. Principally described below is operation when there is a frontal collision of a collision body (a barrier) with one vehicle width direction side of the automobile 12. A micro-wrap collision, an offset collision and the like may be mentioned as examples of this kind of frontal collision. The term "micro-wrap collision" refers to a collision condition in which a portion of an automobile that is at the vehicle width direction outer side relative to a front side member collides with a collision body.

Figure 4:
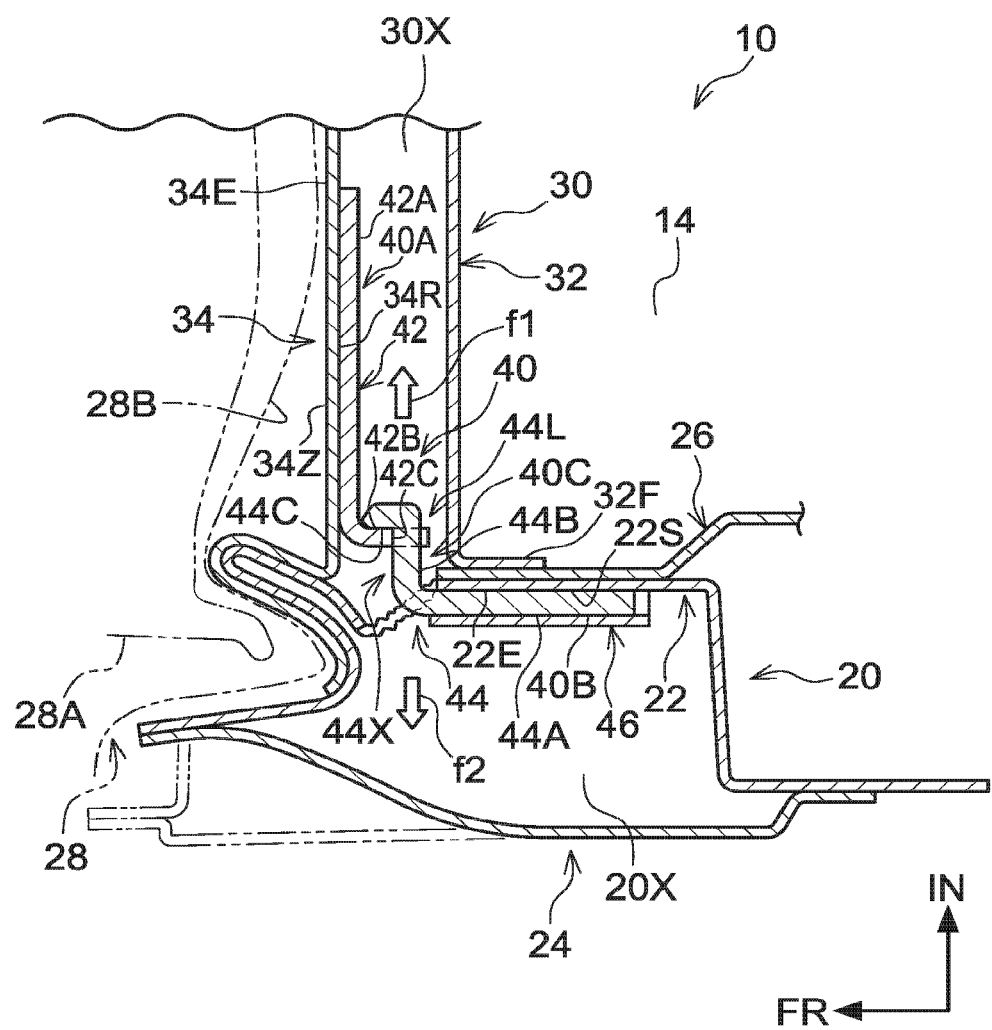
FIG. 4 is a plan sectional view showing a state during a frontal collision in the same sectional view as FIG. 2.

When the automobile 12 has a frontal collision such as a micro-wrap collision or the like, a portion of the front wheel 28 is moved back by a collision load during the collision, to between a vehicle width direction outer side region of the dash panel 32 and the front pillar 20. A load from the front wheel 28 acts toward the vehicle rear side on the dash portion 30 and the front pillar 20. As illustrated in FIG. 4, a load f1 acts on the dash portion 30 toward the vehicle width direction inner side and a load f2 acts on the front pillar 20 toward the vehicle width direction outer side.

In the present exemplary embodiment, as shown in FIG. 2, the dash side structure portion 40A of the load transmission portion 40 is fixed to the surface 34R facing the vehicle rear side at the vehicle width direction outer side region 34Z of the dash cross-member 34 (the dash portion 30). Therefore, when there is a frontal collision, if the dash portion 30 is pushed from the vehicle front side at the joining portion between the dash panel 32 and the front pillar 20, a load toward the vehicle rear side acts on the dash portion 30 and the dash side structure portion 40A of the load transmission portion 40 and, as illustrated in FIG. 4, the load f1 acts toward the vehicle width direction inner side, which is a direction of detachment from the front pillar 20.

As shown in FIG. 2, the load transmission portion 40 is provided with the pillar side structure portion 40B and intermediate structure portion 40C in addition to the dash side structure portion 40A. The pillar side structure portion 40B is fixed to the surface 22S of the inner side upright wall portion 22E of the pillar inner panel 22 that faces the vehicle width direction outer side. The intermediate structure portion 40C is connected with the pillar side structure portion 40B and penetrates the hole portion 22H of the inner side upright wall portion 22E. The intermediate structure portion 40C receives a load that acts on the dash side structure portion 40A when there is a frontal collision and transmits the load to the pillar side structure portion 40B. That is, the load transmission portion 40 is capable of bearing a load as part of a load transmission path, and a load that acts on the joining portion of the dash panel 32 and the front pillar 20 when there is a frontal collision is reduced correspondingly.

As illustrated in FIG. 4, the load f2 acts on the inner side upright wall portion 22E of the pillar inner panel 22 toward the vehicle width direction outer side, and the pillar side structure portion 40B is fixed to the side of the surface 22S facing the vehicle width direction outer side of this inner side upright wall portion 22E. Therefore, even though the load f1 acts toward the vehicle width direction inner side from the dash side structure portion 40A through the intermediate structure portion 40C to the pillar side structure portion 40B, displacement of the pillar side structure portion 40B to the vehicle width direction inner side is suppressed. Moreover, when the load f1 acts toward the vehicle width direction inner side on the pillar side structure portion 40B, a load acts in a compression direction on a joining portion between the bracket 46 and the inner side upright wall portion 22E of the pillar inner panel 22. Therefore, separation of this joining portion is effectively suppressed.

In the present exemplary embodiment, as shown in FIG. 2, the load transmission portion 40 is structured by two members, the dash side member 42 and the pillar side member 44. The dash side member 42 is fixed to the vehicle width direction outer side region 34Z of the dash portion 30 (the dash cross-member 34), and the pillar side member 44 is fixed to the inner side upright wall portion 22E of the pillar inner panel 22. Therefore, assembly characteristics in a joining process are more preferable than in a case in which a load transmission portion is structured by a single member.

The vehicle front side end portion of the pillar side member 44 (i.e., the front projection portion 44C) extends to the vehicle front side. Meanwhile, the rear projection portion 42B formed at the vehicle width direction outer side end portion of the dash side member 42 projects to the vehicle rear side and is disposed at the vehicle width direction outer side relative to the vehicle front side end portion of the pillar side member 44 (the front projection portion 44C). Therefore, when there is a frontal collision, if the dash side member 42 moves diagonally to the vehicle width direction inner side toward the vehicle rear along with a vehicle width direction outer side region of the dash portion 30, the rear projection portion 42B of the dash side member 42 engages with the vehicle front side end portion of the pillar side member 44 (the front projection portion 44C) and the load acting on the dash side member 42 is transmitted to the pillar side member 44.

In the present exemplary embodiment, the front side structure portion 44X of the pillar side member 44 (the intermediate structure portion 40C of the load transmission portion 40) includes the inner projection portion 44B that extends to the vehicle width direction inner side from the vehicle front side end portion of the base plate portion 44A (the pillar side structure portion 40B). The front projection portion 44C that projects to the vehicle front side is set to be at the vehicle width direction inner side of the inner projection portion 44B, and the rear projection portion 42B of the dash side member 42 is located at the vehicle width direction outer side relative to the front projection portion 44C of the pillar side member 44. Therefore, when there is a frontal collision, as illustrated in FIG. 4, the rear projection portion 42B of the dash side member 42 may be engaged with the front projection portion 44C of the pillar side member 44 within a range that overlaps with a range in the vehicle front view in which the dash side member 42 receives the collision load via the dash cross-member 34 of the dash portion 30. As a result, the collision load when there is a frontal collision is reliably transmitted from the dash side member 42 to the pillar side member 44. Therefore, even though the load transmission portion 40 is structured by two members, separation between the dash panel 32 and the front pillar 20 when there is a frontal collision may be reliably suppressed.

In the present exemplary embodiment, the incision portion 42C that opens to the vehicle rear side and has a semi-circular shape in the vehicle side view is formed in the rear projection portion 42B of the dash side member 42 shown in FIG. 2. The inflected portion 44L of the pillar side member 44 is set to be in the range in the vehicle vertical direction that corresponds with the location at which the incision portion 42C is formed. Therefore, even if there is irregularity in the input direction of a collision load when there is a frontal collision and the dash side member 42 tilts in the vehicle side view, a portion of the inflected portion 44L of the pillar side member 44 (a vehicle width direction inner side region of the inner projection portion 44B) enters into the inside of the incision portion 42C of the dash side member 42. Therefore, a periphery portion of the incision portion 42C of the rear projection portion 42B of the dash side member 42 (an engaging portion) may be reliably engaged with the front projection portion 44C of the pillar side member 44 (an engaged portion). Thus, robustness is improved.

In the present exemplary embodiment, as shown in FIG. 3, a portion of the semi-circular protrusion portion 44D serves as the front projection portion 44C. Therefore, depending on a degree of tilting of the dash side member 42 in the vehicle side view, a portion of the periphery portion (the engaging portion) of the incision portion 42C (the engaging portion) may be engaged with an upper end portion, a lower end portion or the like of the semi-circular protrusion portion 44D.

Furthermore, because the base plate portion 44A of the pillar side member 44 is disposed at the inner side of the recessed slot formation portion 46X of the bracket 46, even if a load acts on the pillar side member 44 in the vehicle vertical direction, a retained state of the pillar side member 44 may be securely maintained.

As described above, according to the vehicle body front portion structure 10 in accordance with the present exemplary embodiment that is illustrated in FIG. 2 and the like, separation between the dash panel 32 and the front pillar 20 when there is a frontal collision such as a micro-wrap collision or the like may be suppressed.

To add to these descriptions, a joining portion based on spot welding between the dash panel 32 and the front pillar 20 is easier to separate if a load is inputted in the separation direction than if a load is inputted in a shearing direction. However, in the present exemplary embodiment, separation of the dash panel 32 from the front pillar 20 may be suppressed even when a load is inputted in the separation direction by the front wheel 28 moving back. Because the load transmission portion 40 is specified as in the present exemplary embodiment, there is no need to alter structure or reserve space in order to increase a number of spot-welding points between the dash panel 32 and the front pillar 20.

In the structure according to the present exemplary embodiment, the dash side structure portion 40A of the load transmission portion 40 is disposed adjacent to the surface 34R of the vehicle width direction outer side region 34Z of the dash cross-member 34 which surface faces the vehicle rear side. Therefore, there is no need to narrow a gap between the front wheel 28 and the vehicle width direction outer side region of the dash portion 30.

In the structure according to the present exemplary embodiment, if there is a side collision, the pillar side member 44 fundamentally does not interfere with the dash side member 42. Therefore, even though the load transmission portion 40 is specified, the load transmission portion 40 does not act as a vehicle body side portion structure and unnecessary reinforcement may be avoided. That is, a situation in which, because of unnecessary reinforcement, a change in stiffness specifications of peripheral structural portions is required or the like can be avoided.

Variant Examples

Now, variant examples are described.

Figure 5A:
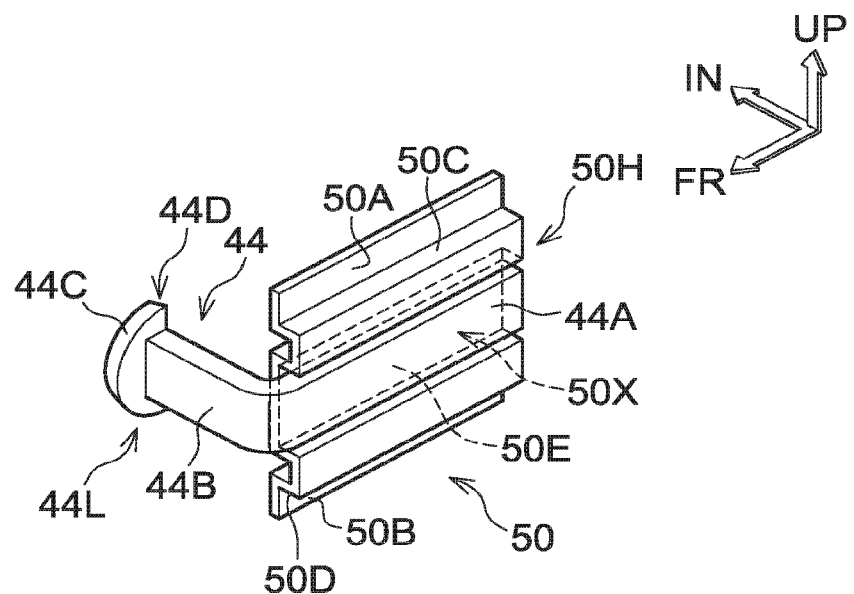
FIG. 5A is a perspective view showing a first variant example of a member for fixing the pillar side member to a pillar inner panel.
Figure 5B:
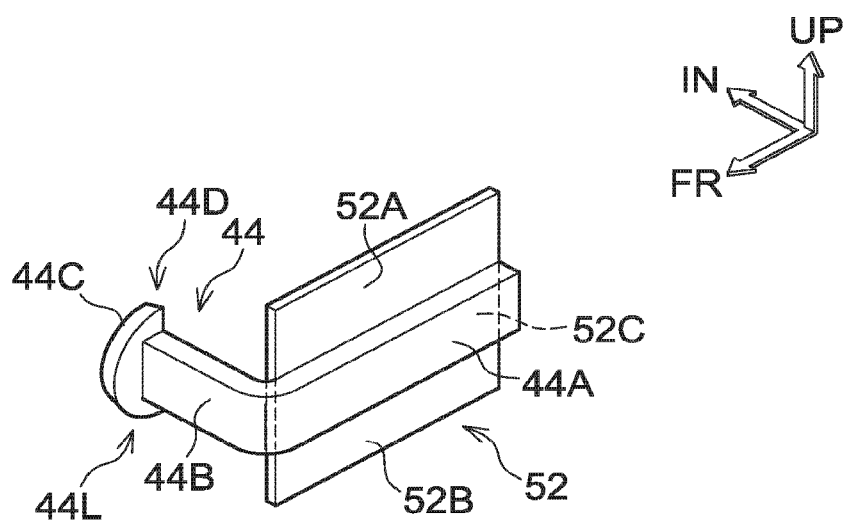
FIG. 5B is a perspective view showing a second variant example of the member for fixing the pillar side member to the pillar inner panel.

FIG. 5A and FIG. 5B show variant examples of the member for fixing the pillar side member 44 to the pillar inner panel 22 (see FIG. 2). That is, as variant examples of the first exemplary embodiment described above, a bracket 50 shown in FIG. 5A or a mounting panel 52 shown in FIG. 5B may be disposed in place of the bracket 46 shown in FIG. 3.

The bracket 50 shown in FIG. 5A is disposed with a length direction thereof in the vehicle front-and-rear direction, and is provided with a hat-shaped portion 50H at an vertical direction middle portion thereof. A shape of the hat-shaped portion 50H in the vehicle front view is formed in a pork pie hat shape with an opening portion oriented to the vehicle width direction outer side. A recessed slot formation portion 50X is formed at an vertical direction middle portion of the hat-shaped portion 50H. The recessed slot formation portion 50X extends in the vehicle front-and-rear direction and an opening portion thereof is oriented to the vehicle width direction outer side. The recessed slot formation portion 50X has a shape that is inverted left-to-right compared to the recessed slot formation portion 46X of the bracket 46 according to the above first exemplary embodiment, which is shown in FIG. 3. As shown in FIG. 5A, the base plate portion 44A of the pillar side member 44 is disposed inside the recessed slot of the recessed slot formation portion 50X, and the base plate portion 44A of the pillar side member 44 is fixed by arc welding to an inner side upright wall portion 50E of the recessed slot formation portion 50X.

The bracket 50 is provided with an upper flange portion 50A and an upper wall portion 50C. The upper flange portion 50A extends in the vehicle vertical direction and the vehicle front-and-rear direction at the vehicle upper side end portion of the bracket 50. The upper wall portion 50C connects a vehicle lower side end portion of the upper flange portion 50A with a vehicle upper side end portion of the hat-shaped portion 50H. The bracket 50 is also provided with a lower flange portion 50B and a lower wall portion 50D. The lower flange portion 50B extends in the vehicle vertical direction and the vehicle front-and-rear direction at the vehicle lower side end portion of the bracket 50. The lower wall portion 50D connects a vehicle upper side end portion of the lower flange portion 50B with a vehicle lower side end portion of the hat-shaped portion 50H. The upper flange portion 50A and lower flange portion 50B are superposed with the surface 22S that faces the vehicle width direction outer side at the rear portion of the inner side upright wall portion 22E of the pillar inner panel 22, which is shown in FIG. 2, and the upper flange portion 50A and lower flange portion 50B are fixed by spot welding to the inner side upright wall portion 22E.

Alternatively, the mounting panel 52 shown in FIG. 5B is formed in a rectangular flat plate shape. A length in the vehicle vertical direction of the mounting panel 52 is specified to be longer than a length in the vehicle vertical direction of the base plate portion 44A of the pillar side member 44. The base plate portion 44A of the pillar side member 44 is superposed with a surface of a vehicle vertical direction middle portion 52C of the mounting panel 52, which surface faces the vehicle width direction outer side, and the base plate portion 44A is fixed to the surface by arc welding. An upper portion 52A and lower portion 52B of the mounting panel 52 are superposed with the surface 22S that faces the vehicle width direction outer side at the rear portion of the inner side upright wall portion 22E of the pillar inner panel 22, which is shown in FIG. 2, and are fixed to the inner side upright wall portion 22E by spot welding.

In the variant examples illustrated in FIG. 5A and FIG. 5B, when there is a frontal collision, then when the dash side member 42 engages with the pillar side member 44 (see FIG. 4) and a load acts on the pillar side member 44 toward the vehicle width direction inner side, a compression load acts on the joining face between the pillar side member 44 and the bracket 50 according to the variant example in FIG. 5A, or the joining face between the pillar side member 44 and the mounting panel 52 according to the variant example in FIG. 5B. Consequently, the retained state of the pillar side member 44 is securely maintained. In the variant example shown in FIG. 5A, the base plate portion 44A of the pillar side member 44 is disposed inside the recessed slot of the recessed slot formation portion 50X. Therefore, similarly to the case of the first exemplary embodiment described above, the retained state of the pillar side member 44 is securely maintained even if a load in the vehicle vertical direction acts on the pillar side member 44.

Figure 6:
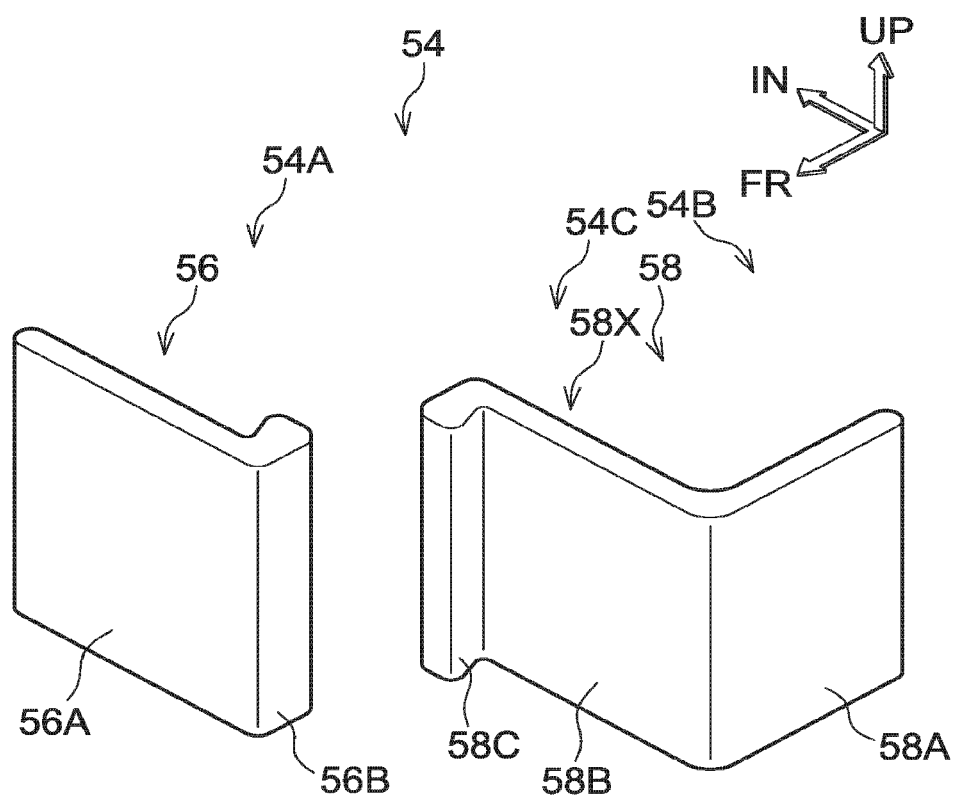
FIG. 6 is an exploded perspective view showing a first variant example of the dash side member and the pillar side member.
Figure 7:
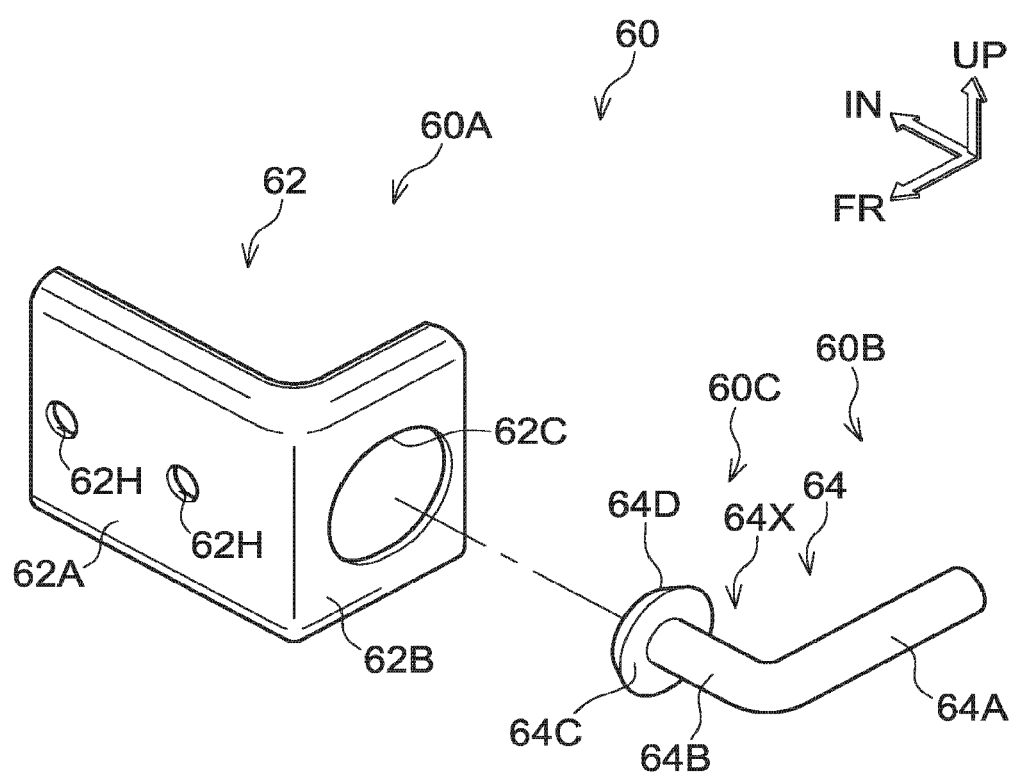
FIG. 7 is an exploded perspective view showing a second variant example of the dash side member and the pillar side member.

FIG. 6 and FIG. 7 show variant examples of the two members that constitute the load transmission portion in exploded perspective views. That is, as a variant example of the above first exemplary embodiment, the dash side member 56 shown in FIG. 6 is disposed in place of the dash side member 42 shown in FIG. 3 and the pillar side member 58 shown in FIG. 6 is disposed in place of the pillar side member 44 shown in FIG. 3. Further, as an alternative variant example of the above first exemplary embodiment, the dash side member 62 shown in FIG. 7 is disposed in place of the dash side member 42 shown in FIG. 3 and the pillar side member 64 shown in FIG. 7 is disposed in place of the pillar side member 44 shown in FIG. 3.

The dash side member 56 shown in FIG. 6 structures a dash side structure portion 54A of a load transmission portion 54 according to this variant example. The dash side member 56 is structured by a plate-shaped member fabricated of metal and a shape thereof in the vehicle plan view is an L-shape. The dash side member 56 is provided with a base plate portion 56A, which is disposed along the vehicle width direction, and a rear projection portion 56B, which is inflected from a vehicle width direction outer side end portion of the base plate portion 56A and projects to the vehicle rear side. The dash side member 56 is disposed at a similar location to the dash side member 42 according to the above first exemplary embodiment, which is shown in FIG. 2. Similarly to the above first exemplary embodiment, the base plate portion 56A (see FIG. 6) is fixed by spot welding to the vehicle width direction outer side region 34Z of the front wall portion 34E of the dash cross-member 34 (the dash portion 30).

A surface at the vehicle width direction inner side of the rear projection portion 56B shown in FIG. 6 is inclined to the vehicle width direction inner side toward the vehicle rear side. Dimensions of the rear projection portion 56B in the vehicle width direction are specified to be larger at a projection distal end portion of the rear projection portion 56B than at a proximal end portion at the side thereof at which the base plate portion 56A is disposed. A projection length of the rear projection portion 56B to the vehicle rear side from the base plate portion 56A is specified to be shorter than a projection length of the rear projection portion 42B to the vehicle rear side from the base plate portion 42A according to the above first exemplary embodiment, which is shown in FIG. 2.

Meanwhile, the pillar side member 58 shown in FIG. 6 structures a pillar side structure portion 54B and an intermediate structure portion 54C of the load transmission portion 54. The pillar side member 58 is also structured by a plate-shaped member fabricated of metal. A shape of the pillar side member 58 in the vehicle plan view is broadly the same shape as the pillar side member 44 according to the above first exemplary embodiment shown in FIG. 2. As shown in FIG. 6, a length in the vehicle vertical direction of the pillar side member 58 is specified to be the same as a length in the vehicle vertical direction of the dash side member 56.

The pillar side member 58 is provided with a base plate portion 58A, an inner projection portion 58B and a front projection portion 58C. The base plate portion 58A is a structural portion substantially the same as the base plate portion 44A according to the above first exemplary embodiment (see FIG. 2), the inner projection portion 58B is a structural portion substantially the same as the inner projection portion 44B according to the above first exemplary embodiment (see FIG. 2), and the front projection portion 58C is a structural portion substantially the same as the front projection portion 44C according to the above first exemplary embodiment (see FIG. 2). A front side structure portion 58X structures a region at the vehicle front side of the pillar side member 58. The front side structure portion 58X is provided with the inner projection portion 58B and the front projection portion 58C. The front side structure portion 58X is a structural portion substantially the same as the front side structure portion 44X according to the above first exemplary embodiment (see FIG. 2). A surface at the vehicle width direction outer side of the front projection portion 58C is angled to the vehicle width direction outer side toward the vehicle front side. Dimensions of the front projection portion 58C in the vehicle width direction are specified to be larger at a projection distal end portion of the front projection portion 58C than at a proximal end portion at the side thereof at which the inner projection portion 58B is disposed.

The pillar side member 58 is disposed at a similar location to the pillar side member 44 according to the above first exemplary embodiment shown in FIG. 2. Of the pillar side member 58 shown in FIG. 6, the base plate portion 58A that structures the pillar side structure portion 54B of the load transmission portion 54 is fixed via the bracket 46 to the inner side upright wall portion 22E of the pillar inner panel 22, which is shown in FIG. 2, substantially the same as in the above first exemplary embodiment. The front side structure portion 58X of the pillar side member 58 shown in FIG. 6 structures the intermediate structure portion 54C of the load transmission portion 54. The front side structure portion 58X penetrates a hole portion formed in a pillar inner panel (a pillar inner panel that is substantially the same as the pillar inner panel 22 shown in FIG. 2). (The hole portion is formed at a region that contains the hole portion 22H shown in FIG. 2, lengthens the hole portion 22H in the vehicle vertical direction, and has a substantially rectangular shape in the vehicle side view.) In the assembled state, the front projection portion 58C of the pillar side member 58 shown in FIG. 6 is located at the vehicle width direction inner side relative to the rear projection portion 56B of the dash side member 56. That is, the front side structure portion 58X of the pillar side member 58 is set to a location at which the front side structure portion 58X receives a load that acts on the dash side member 56 (the dash side structure portion 54A) when there is a frontal collision and transmits the load to the base plate portion 58A (the pillar side structure portion 54B).

According to this variant example too, separation between the dash panel and the front pillar when there is a frontal collision such as a micro-wrap collision or the like may be suppressed. Furthermore, in this variant example, an engagement area between the dash side member 56 and the pillar side member 58 when there is a frontal collision may be assured to be large. Therefore, load-bearing by the load transmission portion 54 may be increased.

The dash side member 62 shown in FIG. 7, which is an alternative variant example, structures a dash side structure portion 60A of a load transmission portion 60 according to this variant example. The dash side member 62 is structured by a plate-shaped member fabricated of metal and a shape thereof in the vehicle plan view is an L-shape. The dash side member 62 is provided with a base plate portion 62A, which is disposed along the vehicle width direction, and a rear projection portion 62B, which is inflected from the vehicle width direction outer side end portion of the base plate portion 62A and projects to the vehicle rear side. The dash side member 62 is disposed at a similar location to the dash side member 42 according to the above first exemplary embodiment, which is shown in FIG. 2. Similarly to the above first exemplary embodiment, the base plate portion 62A (see FIG. 7) is fixed by spot welding or the like to the vehicle width direction outer side region 34Z of the front wall portion 34E of the dash cross-member 34 (the dash portion 30).

Similarly to the base plate portion 42A according to the above first exemplary embodiment (see FIG. 3), a through-hole 62H is formed penetrating the base plate portion 62A shown in FIG. 7. A projection length of the rear projection portion 62B to the vehicle rear side from the base plate portion 62A is specified to be longer than the projection length of the rear projection portion 42B to the vehicle rear side from the base plate portion 42A according to the above first exemplary embodiment, which is shown in FIG. 2. A penetrating hole 62C with a circular shape is formed in the rear projection portion 62B. The penetrating hole 62C penetrates in the vehicle width direction.

Meanwhile, the pillar side member 64 structures a pillar side structure portion 60B and an intermediate structure portion 60C of the load transmission portion 60. The pillar side member 64 is also structured by a member fabricated of metal. A shape of the pillar side member 64 in the vehicle plan view is broadly the same shape as the pillar side member 44 according to the above first exemplary embodiment shown in FIG. 2, except for a vehicle width direction inner side end portion of the pillar side member 64.

The pillar side member 64 is provided with a base rod portion 64A formed in a circular rod shape, an inner projection portion 64B formed in a circular rod shape, and a front projection portion 64C. The base rod portion 64A is a structural portion substantially the same as the base plate portion 44A according to the above first exemplary embodiment (see FIG. 2), the inner projection portion 64B is a structural portion substantially the same as the inner projection portion 44B according to the above first exemplary embodiment (see FIG. 2), and the front projection portion 64C is a structural portion substantially the same as the front projection portion 44C according to the above first exemplary embodiment (see FIG. 2). A front side structure portion 64X structures a region at the vehicle front side of the pillar side member 64. The front side structure portion 64X is provided with the inner projection portion 64B and the front projection portion 64C. The front side structure portion 64X is a structural portion substantially the same as the front side structure portion 44X according to the above first exemplary embodiment (see FIG. 2). The front projection portion 64C structures a portion of a protrusion portion 64D that protrudes in a radiating shape from a vehicle width direction inner side end portion of the inner projection portion 64B and is formed in a truncated cone shape. The protrusion portion 64D is structured such that a diameter of a vehicle width direction outer side end portion thereof is larger than a diameter of a vehicle width direction inner side end portion thereof.

The pillar side member 64 is disposed at a similar location to the pillar side member 44 according to the above first exemplary embodiment, which is shown in FIG. 2. Of the pillar side member 64 shown in FIG. 7, the base rod portion 64A that structures the pillar side structure portion 60B of the load transmission portion 60 is fixed via a bracket or the like to the inner side upright wall portion 22E of the pillar inner panel 22, which is shown in FIG. 2, substantially the same as in the above first exemplary embodiment.

The front side structure portion 64X of the pillar side member 64 shown in FIG. 7 structures the intermediate structure portion 60C of the load transmission portion 60. The front side structure portion 64X penetrates a hole portion formed in a pillar inner panel (a pillar inner panel that is substantially the same as the pillar inner panel 22 shown in FIG. 2). (The hole portion is formed at a region that contains the hole portion 22H shown in FIG. 2, in a shape in the vehicle side view that is circular.) The front side structure portion 64X also penetrates the penetrating hole 62C in the dash side member 62 shown in FIG. 7. In the assembled state, the front projection portion 64C of the pillar side member 64 is located at the vehicle width direction inner side relative to the rear projection portion 62B of the dash side member 62. That is, the front side structure portion 64X of the pillar side member 64 is set to a location at which the front side structure portion 64X receives a load that acts on the dash side member 62 (the dash side structure portion 60A) when there is a frontal collision and transmits the load to the base rod portion 64A (the pillar side structure portion 60B).

According to this variant example too, separation between the dash panel and the front pillar when there is a frontal collision such as a micro-wrap collision or the like may be suppressed. Furthermore, in this variant example, even if there is irregularity in the input direction of a collision load when there is a frontal collision and the dash side member 62 tilts in the vehicle side view, a periphery portion of the penetrating hole 62C of the rear projection portion 62B of the dash side member 62 (an engaging portion) may be reliably engaged with the front projection portion 64C of the pillar side member 64 (an engaged portion). (Thus, robustness is improved.) Moreover, in the present exemplary embodiment, a portion of the protrusion portion 64D serves as the front projection portion 64C. Therefore, depending on a degree of tilting of the dash side member 62 in the vehicle side view, a portion of the periphery portion (the engaging portion) of the penetrating hole 62C may be engaged with a region of the protrusion portion 64D other than the front projection portion 64C.

Second Exemplary Embodiment

Figure 8:
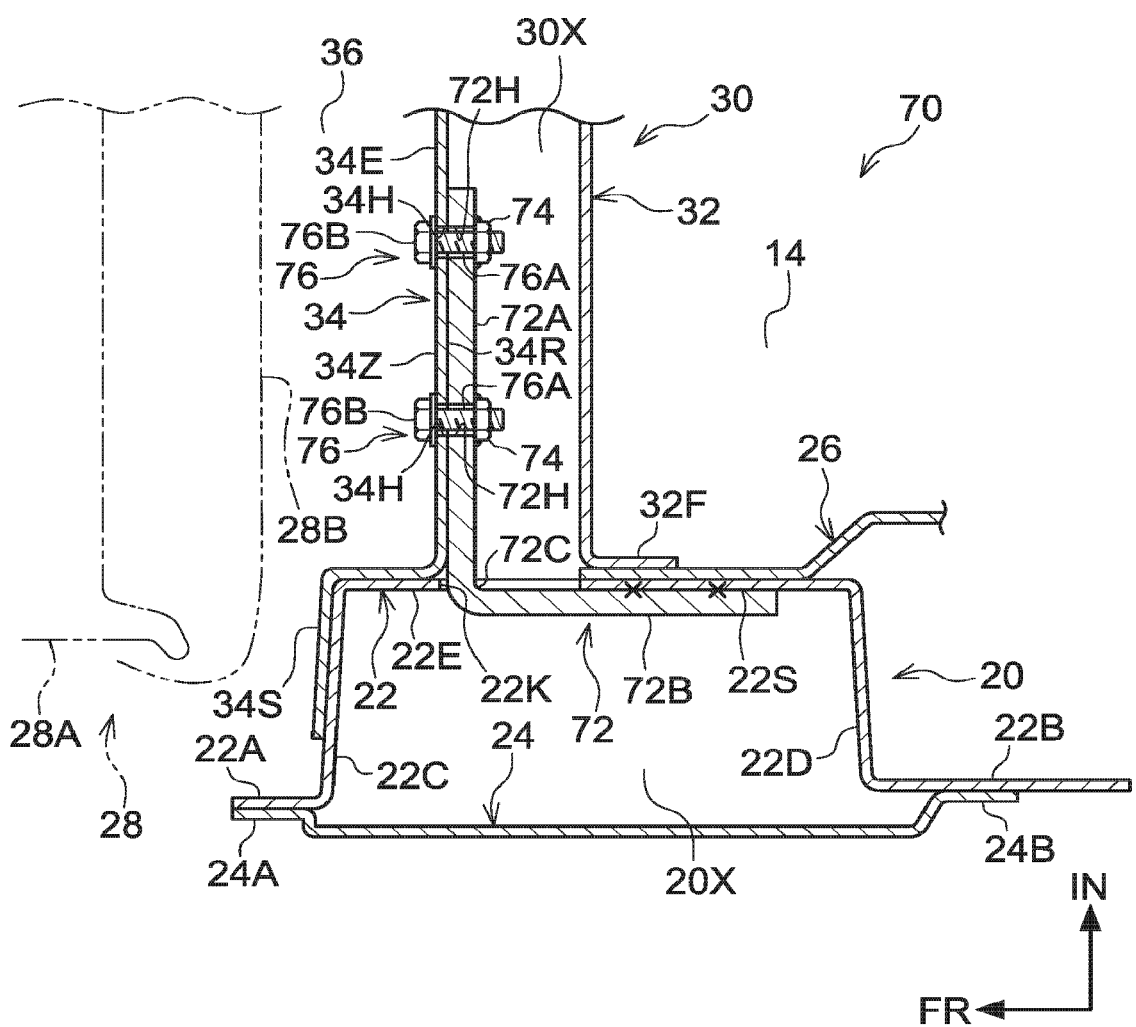
FIG. 8 is a plan sectional view showing a vehicle body front portion structure in accordance with a second exemplary embodiment of the present invention.

A vehicle body front portion structure according to a second exemplary embodiment of the present invention is described using FIG. 8. FIG. 8 shows a vehicle body front portion structure 70 according to the present exemplary embodiment in a plan sectional view (a sectional view corresponding to FIG. 2 of the first exemplary embodiment). As is shown in FIG. 8, the vehicle body front portion structure 70 differs from the vehicle body front portion structure 10 according to the first exemplary embodiment in being provided with a load transmission member 72 instead of the load transmission portion 40 according to the first exemplary embodiment (see FIG. 2). The load transmission member 72 structures a load transmission portion with a single member. Other structures are substantially the same as in the first exemplary embodiment except in the respects described below. Therefore, structural portions that are substantially the same as in the first exemplary embodiment are assigned the same reference numerals and are not described.

As shown in FIG. 8, a hole portion 22K is formed penetrating the pillar inner panel 22. The hole portion 22K is formed forward of the vehicle front-and-rear direction middle portion of the inner side upright wall portion 22E. The hole portion 22K is set at a vehicle vertical direction location that corresponds with an vertical direction middle portion of the front wheel 28, that is, at a lower portion of the inner side upright wall portion 22E. The hole portion 22K is formed in, for example, a substantially rectangular shape in the vehicle side view. The hole portion 22K faces into the interior space of the closed cross section 30X formed by the dash panel 32 and the dash cross-member 34.

The load transmission member 72 is set in a range extending through both the closed cross section 30X of the dash portion 30 and the closed cross section 20X of the front pillar 20. The load transmission member 72 is structured by, for example, a plate-shaped member fabricated of metal. The load transmission member 72 is a member whose shape in the vehicle plan view is an L-shape and that is long in the vehicle width direction. The cross-sectional shape of the load transmission member 72 that is shown in FIG. 8 extends in the vehicle vertical direction. The length in the vehicle vertical direction of the load transmission member 72 is, for example, specified to be equal to that of the dash side member 42 according to the first exemplary embodiment (see FIG. 3).

The load transmission member 72 is provided with a dash side structure portion 72A. The dash side structure portion 72A is disposed adjacent to the surface 34R of the vehicle width direction outer side region 34Z of the front wall portion 34E of the dash cross-member 34 (the dash portion 30) that faces the vehicle rear side. Bolt insertion holes 72H are formed penetrating the dash side structure portion 72A. Bolt insertion holes 34H are formed penetrating the front wall portion 34E of the dash cross-member 34 at locations that oppose the bolt insertion holes 72H of the dash side structure portion 72A. Weld nuts 74 (elements which may be broadly understood as "fasteners") are fixed in advance to the surface of the dash side structure portion 72A that faces the vehicle rear side, at outer periphery portions of the bolt insertion holes 72H. Bolts 76 (elements which may be broadly understood as "fasteners") penetrate the weld nuts 74 and the bolt insertion holes 34H and 72H from the vehicle front side, and shaft portions 76A of the bolts 76 are screwed into the weld nuts 74.

Thus, the front wall portion 34E of the dash cross-member 34 and the dash side structure portion 72A of the load transmission member 72 are sandwiched and fastened between head portions 76B of the bolts 76 and the weld nuts 74. That is, the dash side structure portion 72A of the load transmission member 72 is fixed by bolt-fastening to the vehicle width direction outer side region 34Z of the front wall portion 34E of the dash cross-member 34.

The load transmission member 72 is further provided with a pillar side structure portion 72B that is disposed adjacent to the surface 22S facing the vehicle width direction outer side of the inner side upright wall portion 22E of the pillar inner panel 22. The pillar side structure portion 72B is fixed to the inner side upright wall portion 22E of the pillar inner panel 22 by spot welding (points of which are indicated by the symbol "X").

The load transmission member 72 is further provided with an intermediate structure portion 72C that is connected to both the dash side structure portion 72A and the pillar side structure portion 72B. The intermediate structure portion 72C penetrates the hole portion 22K. The intermediate structure portion 72C is a structural portion that is set at a location at which the intermediate structure portion 72C receives a load that acts on the dash side structure portion 72A when there is a frontal collision and transmits the load to the pillar side structure portion 72B.

When there is a frontal collision such as a micro-wrap collision or the like, separation between the dash panel 32 and the front pillar 20 may be suppressed by the structure according to the present exemplary embodiment too. Moreover, in the present exemplary embodiment, when there is a frontal collision, a collision load may be transmitted from the dash side structure portion 72A via the intermediate structure portion 72C to the pillar side structure portion 72B from when the collision load first acts on the dash side structure portion 72A.

Third Exemplary Embodiment

Figure 9:
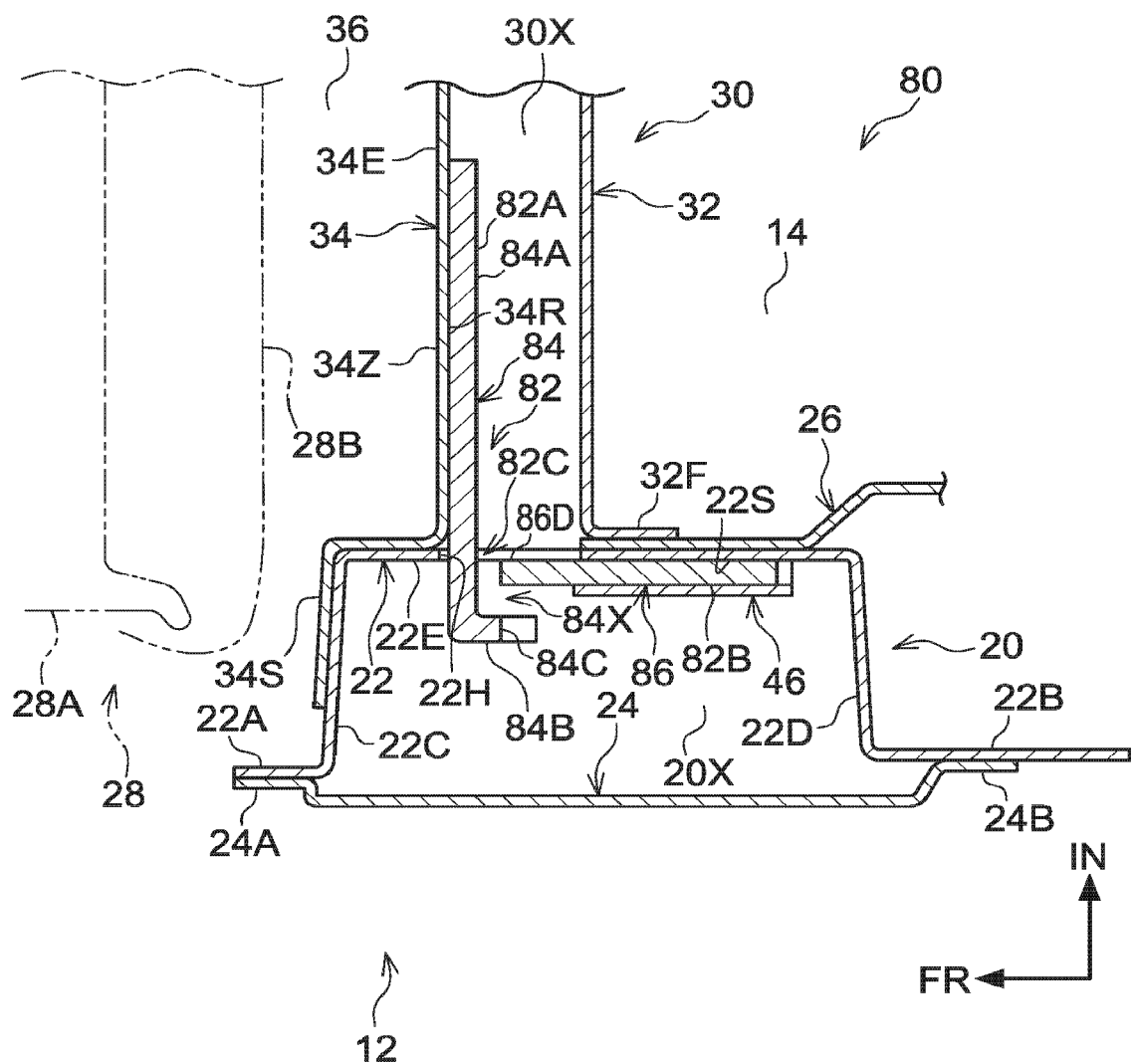
FIG. 9 is a plan sectional view showing a vehicle body front portion structure in accordance with a third exemplary embodiment of the present invention.

A vehicle body front portion structure according to a third exemplary embodiment of the present invention is described using FIG. 9. FIG. 9 shows a vehicle body front portion structure 80 according to the present exemplary embodiment in a plan sectional view (a sectional view corresponding to FIG. 2 of the first exemplary embodiment). As is shown in FIG. 9, the vehicle body front portion structure 80 differs from the vehicle body front portion structure 10 according to the first exemplary embodiment in being provided with a load transmission portion 82 instead of the load transmission portion 40 according to the first exemplary embodiment (see FIG. 2). Other structures are substantially the same as in the first exemplary embodiment. Therefore, structural portions that are substantially the same as in the first exemplary embodiment are assigned the same reference numerals and are not described.

As shown in FIG. 9, the load transmission portion 82 is set in a range extending through both the closed cross section 30X of the dash portion 30 and the closed cross section 20X of the front pillar 20. The load transmission portion 82 is structured by two members, a pillar side member 86 and a dash side member 84. The pillar side member 86 structures a pillar side structure portion 82B. The dash side member 84 structures a dash side structure portion 82A and an intermediate structure portion 82C.

The pillar side member 86 is structured by, for example, a flat plate-shaped member fabricated of metal. The pillar side member 86 extends in the vehicle front-and-rear direction and the vehicle vertical direction and is disposed with a length direction thereof in the vehicle front-and-rear direction. The pillar side member 86 is disposed adjacent to the surface 22S of the inner side upright wall portion 22E of the pillar inner panel 22 that faces the vehicle width direction outer side. The pillar side member 86 is fixed to the inner side upright wall portion 22E via the bracket 46. A state in which the pillar side member 86 is assembled to the bracket 46 is similar to the state in which the pillar side member 44 according to the first exemplary embodiment is assembled to the bracket 46, which is shown in FIG. 2.

Although not shown in the drawing, a semi-circular portion is formed at a vehicle front side end portion 86D of the pillar side member 86. The semi-circular portion is formed, in the vehicle side view, in a semi-circular shape (a "D" shape) that protrudes in the vehicle vertical direction with a circular arc portion at the vehicle front side. In other words, the semi-circular portion has a similar shape to the semi-circular protrusion portion 44D of the pillar side member 44 according to the first exemplary embodiment shown in FIG. 3. A length in the vehicle vertical direction of the pillar side member 86 is specified to be approximately the same as the length in the vehicle vertical direction of the pillar side member 44 according to the first exemplary embodiment (see FIG. 3).

The dash side member 84 is structured by, for example, a plate-shaped member fabricated of metal. The dash side member 84 is a member whose shape in the vehicle plan view is an L-shape and that is long in the vehicle width direction. More specifically, the dash side member 84 has a shape that lengthens the base plate portion 42A of the dash side member 42 according to the first exemplary embodiment, which is shown in FIG. 2, to the vehicle width direction outer side.

As shown in FIG. 9, the dash side member 84 is provided with a base plate portion 84A that is disposed adjacent to the surface 34R of the vehicle width direction outer side region 34Z of the front wall portion 34E of the dash cross-member 34 (the dash portion 30), which surface 34R faces the vehicle rear side. The base plate portion 84A is fixed to the vehicle width direction outer side region 34Z by spot welding. That is, the base plate portion 84A of the dash side member 84 structures the dash side structure portion 82A of the load transmission portion 82.

The dash side member 84 is also provided with an outer side structure portion 84X that is connected to the base plate portion 84A. The outer side structure portion 84X penetrates the hole portion 22H. A rear projection portion 84B is formed at a vehicle width direction outer side end portion of the outer side structure portion 84X. The rear projection portion 84B is inflected from this end portion and projects to the vehicle rear side. The rear projection portion 84B of the dash side member 84 is located at the vehicle width direction outer side relative to the vehicle front side end portion 86D of the pillar side member 86.

An incision portion 84C is formed in the rear projection portion 84B of the dash side member 84. The incision portion 84C is cut away in a semi-circular shape in the vehicle side view, opening to the vehicle rear side. The vehicle front side end portion 86D of the pillar side member 86 described above is set to be within a range in the vehicle vertical direction that corresponds with the location at which the incision portion 84C of the rear projection portion 84B of the dash side member 84 is formed.

The outer side structure portion 84X of the dash side member 84 described above, which is shown in FIG. 9, structures the intermediate structure portion 82C of the load transmission portion 82 and is set to a location at which the outer side structure portion 84X transmits a load that acts on the base plate portion 84A (the dash side structure portion 82A) when there is a frontal collision to the pillar side member 86 (the pillar side structure portion 82B).

According to the present exemplary embodiment, a load acting on the dash side member 84 when there is a frontal collision may be transmitted to the pillar side member 86 by a periphery portion (an engaging portion) of the incision portion 84C of the rear projection portion 84B of the dash side member 84 engaging with the vehicle front side end portion 86D of the pillar side member 86 (an engaged portion). Therefore, separation between the dash panel 32 and the front pillar 20 when there is a frontal collision such as a micro-wrap collision or the like may be suppressed.

Supplementary Descriptions of the Exemplary Embodiments

In the above exemplary embodiments, cases are described in which the vehicle body front portion structures 10, 70 and 80 are basically structured with left-and-right symmetry and the load transmission portions are provided at both left and right sides of a vehicle body. However, structures in which the load transmission portion is provided only at a vehicle body left side and structures in which the load transmission portion is provided only at a vehicle body right side may be employed.

As a variant example of the above exemplary embodiments, a dash cross-member may be disposed at the vehicle rear side of the dash panel and a dash side structure portion of a load transmission portion may be fixed to a surface of a vehicle width direction outer side region of the dash panel that faces the vehicle rear side. As an alternative variant example, in a structure in which a dash portion is not equipped with a dash cross-member, the dash side structure portion of a load transmission portion may be fixed to a surface of a vehicle width direction outer side region of the dash panel that faces the vehicle rear side.

As a variant example of the first exemplary embodiment described above, an incision portion may be formed at the front projection portion of the pillar side member, which incision portion opens to the vehicle front side (the side of the direction of projection of the front projection portion) and has a semi-circular shape in the vehicle side view, an inflected portion with an L-shape in the vehicle plan view may be formed by the rear projection portion of the dash side member and a portion connecting with the rear projection portion (a flat plate portion), and the inflected portion may be set to be within a range in the vehicle vertical direction that corresponds with a location at which the incision portion is formed. According to this variant example, even if there is irregularity in the input direction of a collision load when there is a frontal collision and the dash side member tilts in the vehicle side view, the region that connects with the rear projection portion (a vehicle width direction outer side region of a base plate portion (42A)) enters into the inside of the incision portion formed in the front projection portion. Thus, a periphery portion of the incision portion formed in the front projection portion (the engaged portion) may be reliably engaged with the rear projection portion (the engaging portion).

The concept of the recitation "fixed to a surface" recited in claim 1 encompasses cases of fixing in contact with a surface as in the exemplary embodiments described above and also encompasses cases of fixing to a surface via a collar or the like rather than by contact with the surface.

The exemplary embodiments described above and the numerous variant examples mentioned above may be embodied in suitable combinations.

Hereabove, examples of the present invention have been described. The present invention is not limited by these descriptions and it will be clear that numerous modifications outside of these descriptions may be embodied within a technical scope not departing from the spirit of the invention.

What is claimed is:

1. A vehicle body front portion structure, comprising:
    a front pillar disposed along a vehicle vertical direction at a vehicle width direction outer side end portion of a vehicle cabin front portion, the front pillar including a pillar inner panel at a vehicle width direction inner side end portion of the front pillar, the pillar inner panel including an inner side upright wall portion that extends in the vehicle vertical direction and a vehicle front-and-rear direction, and a hole portion being formed penetrating a lower portion of the inner side upright wall portion;
    a dash portion including a dash panel that structures a vehicle cabin front wall, a vehicle width direction outer side end portion of the dash panel being joined to the front pillar, and the dash portion separating the vehicle cabin from a power unit compartment that is located at a vehicle front side of the vehicle cabin; and
    a load transmission portion including:
        a dash side structure portion that is fixed to a surface of a vehicle width direction outer side region of the dash portion, which surface faces a vehicle rear side,
        a pillar side structure portion that is fixed to a surface of the inner side upright wall portion of the pillar inner panel, which surface faces a vehicle width direction outer side, and
        an intermediate structure portion that is connected to at least one of the dash side structure portion or the pillar side structure portion, the intermediate structure portion penetrating the hole portion, and the intermediate structure portion being set at a location at which the intermediate structure portion transmits a load that acts on the dash side structure portion when there is a frontal collision to the pillar side structure portion.

2. The vehicle body front portion structure according to claim 1, wherein:
    the load transmission portion is structured by two members, the two members being a dash side member including the dash side structure portion and a pillar side member including the pillar side structure portion, and the intermediate structure portion is provided at the dash side member or the pillar side member,
    a vehicle front side end portion of the pillar side member extends toward the vehicle front side, and
    a rear projection portion is formed at a vehicle width direction outer side end portion of the dash side member, the rear projection portion projecting toward the vehicle rear side and being located at the vehicle width direction outer side relative to a vehicle front side end portion of the pillar side member.

3. The vehicle body front portion structure according to claim 2, wherein:
    the pillar side member includes the intermediate structure portion, the intermediate structure portion including a portion that extends to a vehicle width direction inner side from the vehicle front side end portion of the pillar side structure portion, a front projection portion that projects toward the vehicle front side is formed at a vehicle width direction inner side end portion of the intermediate structure portion, and the rear projection portion of the dash side member is located at the vehicle width direction outer side relative to the front projection portion of the pillar side member.

4. The vehicle body front portion structure according to claim 3, wherein:

an incision portion with a semi-circular shape in a vehicle side view is formed at the rear projection portion or the front projection portion, the incision portion being open to a side of a direction of projection, and an inflected portion with an L-shape in a vehicle plan view is formed by the other of the rear projection portion or the front projection portion and a portion connecting with the other of the rear projection portion or the front projection portion, the inflected portion being set to be within a range in the vehicle vertical direction that corresponds with a location at which the incision portion is formed.

5. The vehicle body front portion structure according to claim 4, wherein:

the incision portion is formed at the rear projection portion, the front projection portion structures a portion of a semi-circular protrusion portion that is formed in a semi-circular shape with a circular arc portion at a vehicle front side in the vehicle side view.

6. The vehicle body front portion structure according to claim 3, wherein:

a penetrating hole with a circular shape is formed in the rear projection portion, the penetrating hole penetrating in a vehicle width direction, and the pillar side member includes the intermediate structure portion, the intermediate structure portion penetrating the penetrating hole.

7. The vehicle body front portion structure according to claim 6, wherein:

the front projection portion structures a portion of a protrusion portion that protrudes in a radiating shape and is formed in a truncated cone shape, the protrusion portion is structured such that a diameter of a vehicle width direction outer side end portion of the protrusion portion is larger than a diameter of a vehicle width direction inner side end portion of the protrusion portion.

8. The vehicle body front portion structure according to claim 1, wherein the load transmission portion is structured by a single member that includes the dash side structure portion, the intermediate structure portion and the pillar side structure portion.

* * * * *